United States Patent
Gunji

(10) Patent No.: US 11,408,818 B2
(45) Date of Patent: Aug. 9, 2022

(54) FLOW CELL UNIT

(71) Applicant: Shimadzu Corporation, Kyoto (JP)

(72) Inventor: Masahide Gunji, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 75 days.

(21) Appl. No.: 16/490,979

(22) PCT Filed: Nov. 27, 2017

(86) PCT No.: PCT/JP2017/042383
§ 371 (c)(1),
(2) Date: Sep. 4, 2019

(87) PCT Pub. No.: WO2018/168094
PCT Pub. Date: Sep. 20, 2018

(65) Prior Publication Data
US 2020/0025674 A1    Jan. 23, 2020

(30) Foreign Application Priority Data

Mar. 17, 2017   (JP) .............................. JP2017-052038

(51) Int. Cl.
*G01N 21/05* (2006.01)
*F16J 15/10* (2006.01)
*G01N 21/64* (2006.01)

(52) U.S. Cl.
CPC ............ *G01N 21/05* (2013.01); *F16J 15/104* (2013.01); *G01N 21/645* (2013.01); *F16J 15/102* (2013.01);
(Continued)

(58) Field of Classification Search
CPC ...... G01N 21/05; G01N 21/645; G01N 21/64; G01N 2021/6482; F16J 15/104; F16J 15/102
See application file for complete search history.

(56) References Cited

U.S. PATENT DOCUMENTS 3,989,285 A * 11/1976 Yancey ................ F16J 15/0881
285/336
4,886,356 A * 12/1989 Paradis .................. G01N 21/05
356/246
(Continued)

FOREIGN PATENT DOCUMENTS

EP          1933069 A1 *  6/2008  ............ F16K 1/465
JP        S55-060838 A     5/1980
(Continued)

OTHER PUBLICATIONS

Japanese Office Action dated Dec. 8, 2020, in connection with corresponding JP Application No. 2019-505706 (9 pp., including machine-generated English translation).
Office Action dated Jun. 30, 2020 in corresponding Japanese Application No. 2019-505706; 9 pages including English-language translation.
(Continued)

*Primary Examiner* — Samuel P Siefke
*Assistant Examiner* — Henry H Nguyen
(74) *Attorney, Agent, or Firm* — Maier & Maier, PLLC

(57) ABSTRACT

A gasket sandwiched between a flow cell and a joint member has, in a main flat surface, an inlet communication hole for communicating between an inlet hole of the flow cell and an inlet flow path of the joint member and an outlet communication hole for communicating between an outlet hole of the flow cell and an outlet flow path of the joint member. Furthermore, a deformation absorbing structure for absorbing deformation of the gasket is provided between the inlet communication hole and the outlet communication hole in the main flat surface of the gasket.

6 Claims, 3 Drawing Sheets

(52) U.S. Cl.
    CPC ..... *G01N 21/64* (2013.01); *G01N 2021/6482* (2013.01)

(56) References Cited

U.S. PATENT DOCUMENTS

| | | | |
|---|---|---|---|
| 2002/0084595 A1* | 7/2002 | Forry | F16J 15/123 277/592 |
| 2011/0042581 A1 | 2/2011 | Gunji | |
| 2017/0252740 A1 | 9/2017 | Okada et al. | |

FOREIGN PATENT DOCUMENTS

| | | |
|---|---|---|
| JP | H05-083576 U | 11/1993 |
| JP | 2011-043332 A | 3/2011 |
| WO | 2016-035817 A1 | 3/2016 |

OTHER PUBLICATIONS

Translation of International Search Report and Written Opinion dated Feb. 13, 2018 of corresponding application No. PCT/JP2017/042383; 9 pages.

Indian Office Action dated Jun. 29, 2021, in connection with corresponding Indian Application No. 201947040867 (6pp.).

Chinese Office Action dated Aug. 27, 2021, in connection with corresponding CN Application No. 201780088357.1 (9 pp., including machine-generated English translation).

Office Action dated Mar. 18, 2022, in connection with corresponding Japanese Application No. 2021-032770 (9 pp., including machine-generated English translation).

Office Action dated May 7, 2022, in connection with corresponding Chinese Application No. 201780088357.1 (11 pp., including machine-generated English translation).

\* cited by examiner

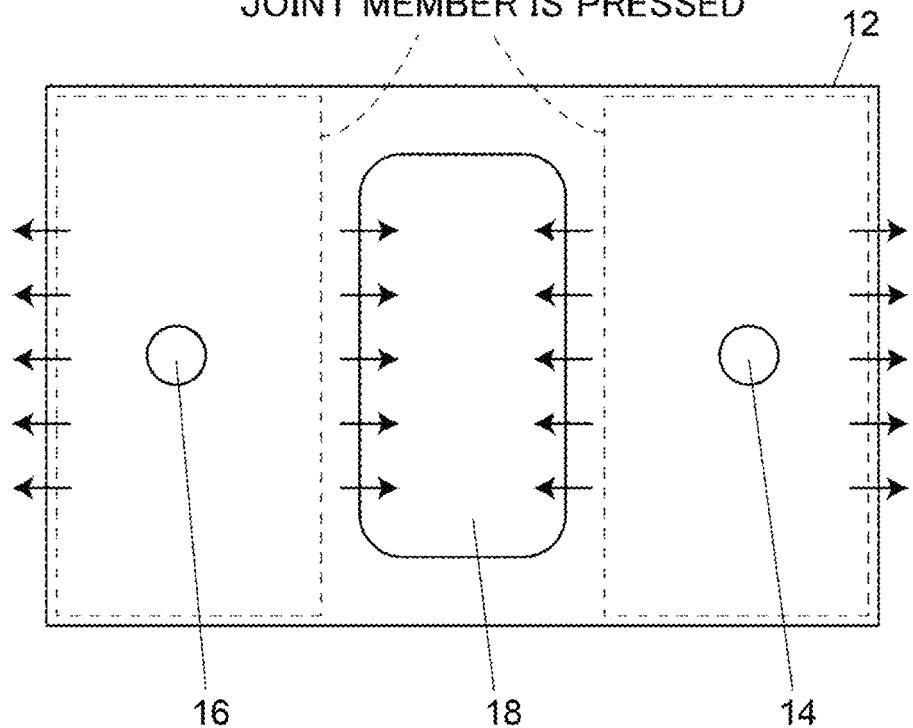

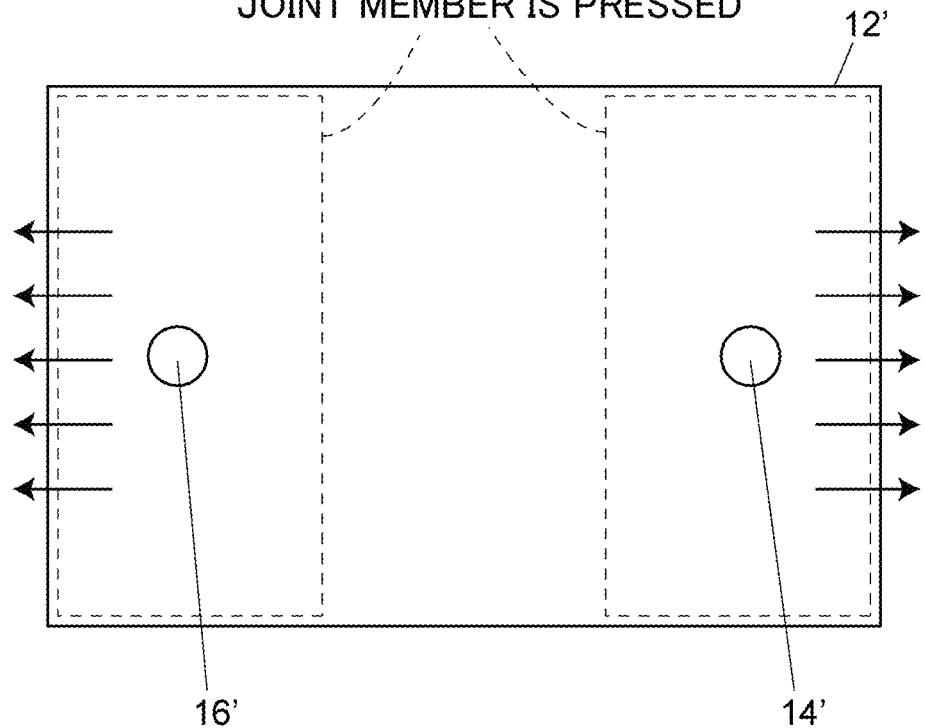

though the joint member and the flow cell are communicated when the flow cell unit is assembled, the joint ratio and the flow cell are not communicated with the passage of time.

FLOW CELL UNIT

FIELD

The present invention relates to a flow cell unit for a detector that performs optical measurement, for example, a fluorescence detector.

BACKGROUND

A fluorescence detector has been known as one of the detectors for liquid chromatography. The fluorescence detector causes liquid to circulate inside a flow cell, irradiates the flow cell with excitation light, and detects fluorescence from a sample component excited by the excitation light with a photodetector (see Patent Document 1).

The flow cell is generally a rectangular parallelepiped shaped member made of a light transmissive material such as quartz. One outer surface of the flow cell is provided with an inlet hole for causing liquid to flow into a space inside the flow cell and an outlet hole for causing the liquid to flow out from the space inside the flow cell. There has been known a flow cell unit configured in such a way that pipes are indirectly connected to the inlet hole and the outlet hole, respectively, through a joint member.

Such a flow cell unit is configured in such a way that the joint member to which the pipes are connected is pressed against the surface of the flow cell provided with the inlet hole and the outlet hole, and communication is secured between the inlet hole and the outlet hole of the flow cell and the pipes through the joint member. A gasket made of resin is sandwiched between the flow cell and the joint member, and the gasket is plastically deformed by stress from the joint member pushed to the flow cell side, thereby securing the sealability between the flow cell and the joint member.

Patent Document 1: Japanese Patent Application Laid-Open Publication No. 2011-043332

SUMMARY

In the flow cell unit described above, it is found that a phenomenon may be caused in which, despite the joint member and the flow cell are communicated when the flow cell unit is assembled, the joint ratio and the flow cell are not communicated with the passage of time.

In view of this, the present invention has an object to reliably maintain communication between pipes and a flow cell in a flow cell unit having a structure in which the pipes are indirectly connected to the flow cell through a joint member.

The inventor of the present invention has found that the gasket sandwiched between the flow cell and the joint member is deformed by the stress from the joint member, and positions of through holes (hereinafter referred to as an inlet communication hole and an outlet communication hole) provided in the gasket may be shifted in an outward direction (directions away from each other). When the positions of the inlet communication hole and the outlet communication hole of the gasket are shifted, the inlet hole and the outlet hole of the flow cell are closed by the gasket, and the pipes connected to the joint member do not communicate with the space in the flow cell.

Then, the inventor of the present invention has found that the reason that the positions of the outlet communication hole and the inlet communication hole of the gasket are shifted only in the outward direction is that an escape place for resin of the gasket crushed by the stress is not present between the inlet communication hole and the outlet communication hole. The present invention has been made based on such a finding.

The flow cell unit according to the present invention includes at least a flow cell, a joint member, and a gasket.

The flow cell is made of a light transmissive material, and includes a space in which liquid flows therein. The flow cell includes a connecting surface provided with an inlet hole which communicates with one end side of the space to cause the liquid to flow into the space, and an outlet hole which communicates with the other end side of the space to cause the liquid to flow out from the space.

The joint member includes a flow cell opposing surface opposed to the connecting surface of the flow cell, an inlet pipe connection port to which an inlet pipe for supplying the liquid to the space in the flow cell is connected, and an outlet pipe connection port to which an outlet pipe for causing the liquid flowing out from the space to flow therethrough is connected. The joint member comprises an inlet flow path for communicating between the inlet hole of the flow cell and the inlet pipe connection port and an outlet flow path for communicating between the outlet hole of the flow cell and the outlet pipe connection port therein. An end of the inlet flow path and an end of the outlet flow path are provided at positions opposed to the inlet hole and the outlet hole in the flow cell opposing surface, respectively.

The gasket is a flat member which includes a main flat surface and is sandwiched between the connecting surface of the flow cell and the flow cell opposing surface of the joint member. An inlet communication hole for communicating between the inlet hole and the inlet flow path and an outlet communication hole for communicating between the outlet hole and the outlet flow path are provided in the main flat surface. A deformation absorbing structure for absorbing deformation of the gasket is provided between the inlet communication hole and the outlet communication hole in the main flat surface.

The "deformation absorbing structure" for absorbing deformation of the gasket means a structure in which an escape place for resin of the gasket crushed by stress from the joint member is secured. One example thereof is a through hole.

In the flow cell unit of the present invention, the deformation absorbing structure for absorbing deformation of the gasket is provided between the inlet communication hole and the outlet communication hole of the gasket, and hence, when the gasket is plastically deformed by the stress from the joint member, the deformation is absorbed by the deformation absorbing structure between the inlet communication hole and the outlet communication hole, so that displacement of the inlet communication hole and the outlet communication hole only in the outward direction is suppressed. As a result, even if the gasket receives the stress from the joint member and is crushed, the amount of displacement of the inlet communication hole and the outlet communication hole in the outward direction is reduced, so that communication between the pipes and the flow cell is maintained.

BRIEF DESCRIPTION OF THE DRAWINGS

FIG. 2 is a plan view of a gasket as viewed from a joint member side.

FIG. 3 is a plan view of the gasket for illustrating a deformation direction of the gasket in which a deformation absorbing structure is not provided.

DETAILED DESCRIPTION

Figure 1:
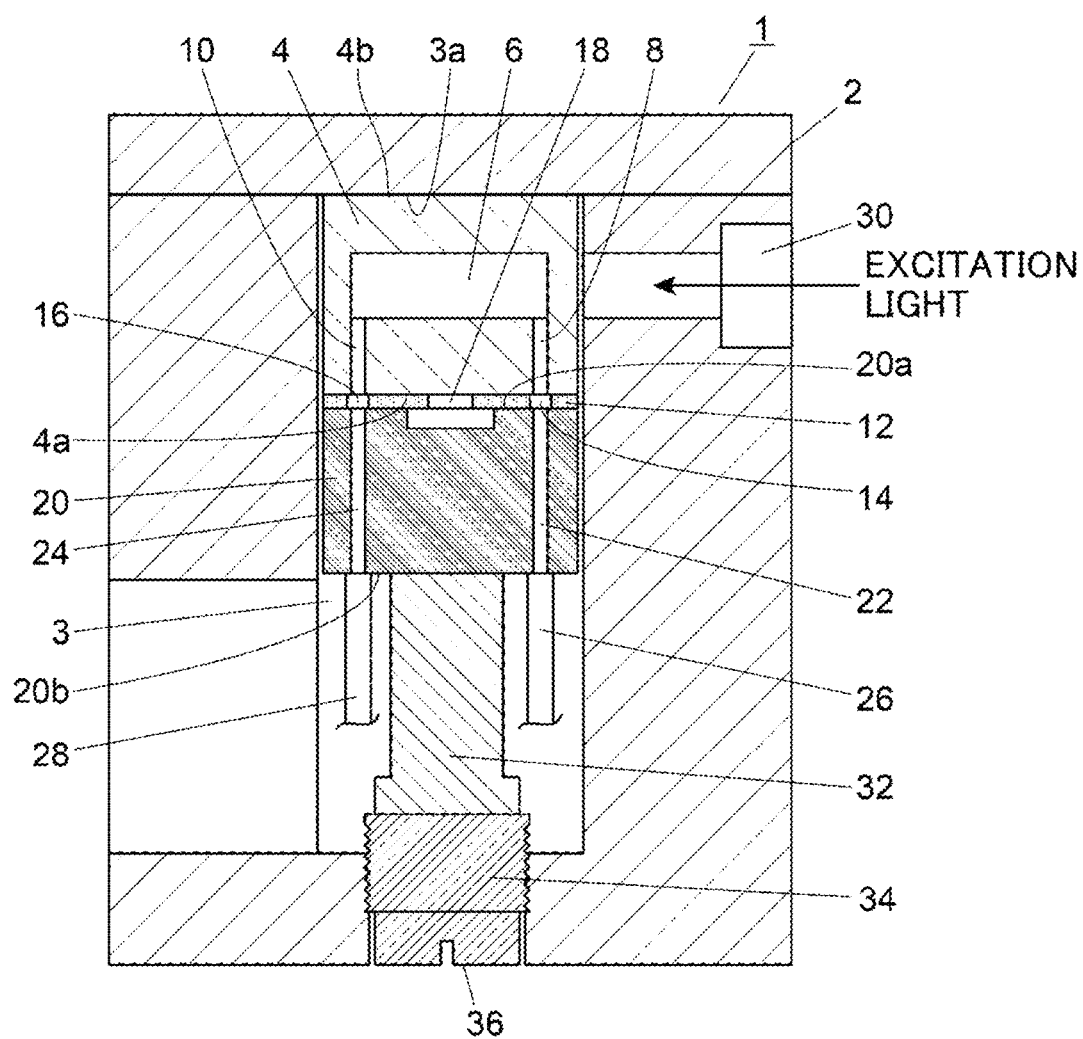
FIG. 1 is a cross-sectional view illustrating an embodiment of a flow cell unit.

One embodiment of a flow cell unit according to the present invention is described with reference to FIG. 1 and FIG. 2.

As illustrated in FIG. 1, a flow cell unit 1 includes a housing 2, and a flow cell 4, a gasket 12, and a joint member 20 are accommodated in an inner space 3 of the housing 2. The material of the housing 2 is, for example, an aluminum alloy such as A5052 or stainless steel such as SUS316.

The flow cell 4 is, for example, a rectangular parallelepiped shaped member made of a light transmissive material such as quartz. Inside the flow cell 4, a space 6 for causing liquid to circulate is provided. One outer surface of the flow cell 4 is provided with an inlet hole 8 communicating with one end side of the inner space 6 and an outlet hole 10 communicating with the other end. In the outer surface of the flow cell 4, a surface 4a provided with the inlet hole 8 and the outlet hole 10 is referred to as a "connecting surface 4a".

The cross-sectional shape of the inner space 3 of the housing 2 is a rectangular shape substantially the same as the connecting surface 4a of the flow cell 4. The flow cell 4 is accommodated so as to be fitted in the inner space of the housing 2 so that a surface 4b on a side opposite to the connecting surface 4a abuts on an innermost surface 3a of the inner space 3 of the housing 2.

The gasket 12 is sandwiched between the flow cell 4 and the joint member 20. The gasket 12 is a flat resin member having a shape and dimensions of the main flat surface which are substantially the same as those of the connecting surface 4a. The material of the gasket 12 is, for example, polytetrafluoroethylene (PTFE) containing carbon particles. An inlet communication hole 14 and an outlet communication hole 16 are provided at corresponding positions of the inlet hole 8 and the outlet hole 10 of the flow cell 4 in the main flat surface of the gasket 12, respectively.

The joint member 20 is a substantially rectangular parallelepiped shaped member made of, for example, SUS316L. The joint member 20 is for indirectly communicating an inlet pipe 26 and an outlet pipe 28 with the inlet hole 8 and the outlet hole 10 of the flow cell 4, respectively. An inlet flow path 22 and an outlet flow path 24 are provided in the joint member 20. Ends on one end side of the inlet flow path 22 and the outlet flow path 24 are disposed at positions corresponding to the inlet communication hole 14 and the outlet communication hole 16 in a surface 20a of the joint member 20 on the flow cell 4 side (flow cell opposing surface). Pipe connection ports (inlet pipe connection port and outlet pipe connection port) for connecting the inlet flow path 26 and the outlet flow path 28 are provided at the ends on the other side of the inlet flow path 22 and the outlet flow path 24, respectively.

The shape and dimensions of the flow cell opposing surface 20a of the joint member 20 are substantially the same as the connecting surface 4a of the flow cell 4 and the main flat surface of the gasket 12. That is, the flow cell 4, the gasket 12, and the joint member 20 are accommodated so as to be fitted in the inner space 3 of the housing 2, and with this, the flow cell 4, the gasket 12, and the joint member 20 are positioned relative to each other.

The housing 2 is provided with a window portion 30 for radiating excitation light to the flow cell 4 accommodated in the inner space 3. Although not illustrated in the figure, the housing 2 is also provided with a window portion for bringing out fluorescence from a sample in the flow cell 4 which is excited by the excitation light in a direction orthogonal to an irradiation direction of the excitation light 30 (direction perpendicular to the drawing sheet in the figure).

A front end surface of the spacer 32 is in contact with a back surface 20b (surface on a side opposite to the flow cell opposing surface 20a) of the joint member 20. A proximal end surface of the spacer 32 is in contact with a distal end surface of an adjustment screw 34. The adjustment screw 34 is threadedly engaged with a screw provided on an inner peripheral surface of a through hole provided in the housing 2 and is moved in an axial direction of the spacer (vertical direction in the drawing) by rotation. The adjustment screw 34 presses the proximal end surface of the spacer 32 to the flow cell 4 side (upper side in the figure). With this, the joint member 20 is pressed by the spacer 32 to the flow cell 4 side, and the flow cell opposing surface 20a of the joint member 20 is pressed against the gasket 12. A back surface 36 (surface on the lower side in the figure) of the adjusting screw 34 is provided with a groove for rotation by a driver.

In this embodiment, in order to improve the sealing performance by the gasket 12, a recess is provided at the central portion of the flow cell opposing surface 20a of the joint member 20, and portions where the inlet flow path 22 and the outlet flow path 24 are provided are intensively pressed onto the gasket 12. The present invention is not limited to this, and the flow cell opposing surface 20a of the joint member 20 may be a flat surface.

The gasket 12 sandwiched between the flow cell 4 and the joint member 20 is deformed by stress received from the joint member 20, and communication is secured between the inlet hole 8 of the flow cell 4 and the inlet flow path 22 of the joint member 20 and between the outlet hole 10 of the flow cell 4 and the outlet flow path 24 of the joint member 20 in a liquid-tight state.

As illustrated in FIG. 2, a through hole 18 as a deformation absorbing structure is provided between the inlet communication hole 14 and the outlet communication hole 16 in the main flat surface of the gasket 12. The through hole 18 is for securing an escape place for resin (material of the gasket 12) when the gasket 12 is crushed by the stress from the joint member 20. Since the through hole 18 is provided, the resin deformed by receiving the stress from the joint member 20 escapes both to the inner side and the outer side of the portion where the joint member 20 is pressed, so that displacement of the inlet communication hole 14 and the outlet communication hole 16 is suppressed.

In the case where a deformation absorbing structure such as the through hole 18 is not provided, as illustrated in FIG. 3, an escape place for the resin crushed by the stress from the joint member 20 is not present between an inlet communication hole 14' and an outlet communication hole 16', so that all of the resin is to move in an outward direction of a gasket 12'. Along with such movement of the resin, the inlet communication hole 14' and the outlet communication hole 16' are also displaced in directions away from each other, and the communication between the flow cell 4 and the joint member 20 is interrupted when the amount of displacement is large.

The inventor of the present invention verified the amount of deformation due to the pressing by the joint member 20 using the gasket 12 in which the through hole 18 is provided and the gasket 12' in which such a deformation absorbing structure is not provided. The gaskets 12 and 12' used in this verification are each PTFE containing carbon particles as a material, and the outer dimensions thereof are in such a ways that the vertical width is about 5 mm, the horizontal width is about 6.5 mm, and the thickness is about 0.5 mm. The gasket 12 is provided with the through hole 18 having a vertical width of about 3 mm and a horizontal width of about 2.5 mm at the central portion.

As a result of the above verification, in the gasket 12' not provided with any deformation absorbing structure, the distance between the inlet communication hole 14' and the outlet communication hole 16' was 4,409 μm before pressing by the joint member 20, and, it was 4,485 μm after pressing by the joint member 20. That is, as the gasket 12' was deformed by being pressed by the joint member 20, the distance between the inlet communication hole 14' and the outlet communication hole 16' was changed largely by 76 μm.

On the other hand, in the gasket 12 provided with the through hole 18 being the deformation absorbing structure, the distance between the inlet communication hole 14 and the outlet communication hole 16 was 4,442 μm before pressing by the joint member 20, and was 4,444 μm after pressing by the joint member 20. That is, even if the gasket 12 was deformed by being pressed by the joint member 20, the distance between the inlet communication hole 14 and the outlet communication hole 16 was changed only by 2 μm.

From the above, it is found that, by providing a deformation absorbing structure such as the through hole 18 between the inlet communication hole 12 and the outlet communication hole 14 in the main flat surface of the gasket 12, even after deformation of the gasket 12 due to stress from the joint member 20, the displacement of the inlet communication hole 12 and the outlet communication hole 14 can be reduced.

In this embodiment, the through hole 18 is described as an example of the deformation absorbing structure of the gasket 12, but the deformation absorbing structure is not limited to this. For example, a structure in which the thickness of the gasket is extremely thinned only in the region of the through hole 18 (for example, a thickness of 0.1 mm) may be adopted as the deformation absorbing structure.

The invention claimed is:

1. A flow cell unit for liquid chromatograph, comprising:
a flow cell which is made of a light transmissive material and includes a space in which liquid flows therein, the flow cell comprising a connecting surface provided with an inlet hole and an outlet hole, the inlet hole communicates with one end side of the space to cause the liquid to flow into the space, and the outlet hole communicates with the other end side of the space to cause the liquid to flow out from the space;
a joint member which includes a flow cell opposing surface opposed to the connecting surface of the flow cell, an inlet pipe connection port to which an inlet pipe for supplying the liquid to the space in the flow cell is connected, and an outlet pipe connection port to which an outlet pipe for causing the liquid flowing out from the space to flow therethrough is connected, the joint member comprises an inlet flow path for communicating between the inlet hole of the flow cell and the inlet pipe connection port and an outlet flow path for communicating between the outlet hole of the flow cell and the outlet pipe connection port therein, an end of the inlet flow path and an end of the outlet flow path are provided at positions opposed to the inlet hole and the outlet hole in the flow cell opposing surface, respectively; and
a gasket which has a flat shape, includes a main flat surface, and is sandwiched between the connecting surface of the flow cell and the flow cell opposing surface of the joint member, wherein an inlet communication hole for communicating between the inlet hole and the inlet flow path and an outlet communication hole for communicating between the outlet hole and the outlet flow path are provided in the main flat surface, and wherein a deformation absorbing structure, which is for suppressing displacement of the inlet communication hole and the outlet communication hole by absorbing deformation of the gasket, is provided between the inlet communication hole and the outlet communication hole in the main flat surface, and wherein the inlet communication hole is a hole in which liquid flows and the outlet communication hole is a hole in which liquid flows,
wherein the deformation absorbing structure is provided at a position on a straight line connecting the center of the inlet communication hole and the center of the outlet communication hole, and
wherein the deformation absorbing structure is deformed in a direction along the straight line by stress received from the joint member, and
wherein the deformation absorption structure suppresses the displacement of the inlet communication hole and the outlet communication hole with respect to the stress from the joint member, so that communication between the inlet hole of the flow cell and the inlet flow path of the joint member is maintained and communication between the outlet hole of the flow cell and the outlet flow path of the joint member is maintained,
wherein a recess is provided at a central portion of the flow cell opposing surface of the joint member, and the recess and the deformation absorbing structure are arranged to be overlapped with each other so that only portions that the inlet flow path and the outlet flow path are provided are pressed onto the gasket.

2. The flow cell unit according to claim 1, wherein the deformation absorbing structure is a through hole.

3. The flow cell unit according to claim 1, wherein the main flat surface of the gasket is a rectangular shape, and the deformation absorbing structure is provided in a central region of the main flat surface.

4. The flow cell unit according to claim 1, wherein the deformation absorbing structure suppresses displacement of the inlet communication hole and the outlet communication hole with respect to stress from the joint member, so that communication between the inlet hole of the flow cell and the inlet flow path of the joint member is maintained and communication between the outlet hole of the flow cell and the outlet flow path of the joint member is maintained.

5. The flow cell unit according to claim 4, wherein shift of a distance between the inlet communication hole and the outlet communication hole due to the stress from the joint member is 2 μm.

6. The flow cell unit according to claim 1,
wherein a material of the gasket deformed by receiving the stress from the joint member due to the deformation absorbing structure escapes both to an inner inside and an outer side of a portion where the joint member is pressed, so that displacement of the inlet communication hole and the outlet communication hole in an outward direction is suppressed.

* * * * *